Apr. 17, 1923.
W. H. BRISTOL
1,452,063
ART OF SYNCHRONOUS OPERATION OF ENTERTAINMENT APPARATUS
Filed April 22, 1920
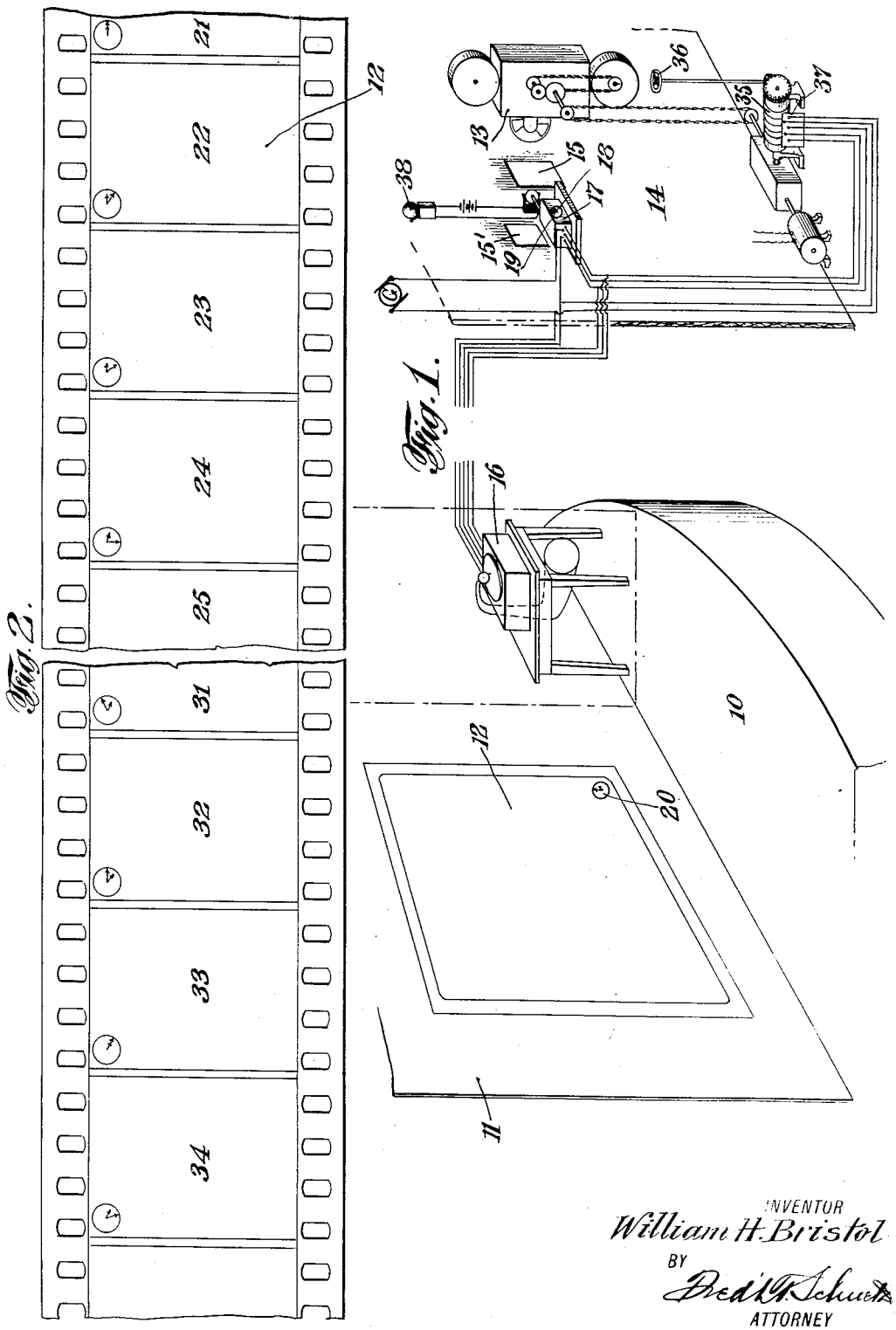
INVENTOR
William H. Bristol
BY
ATTORNEY Patented Apr. 17, 1923.

1,452,063

UNITED STATES PATENT OFFICE.

WILLIAM H. BRISTOL, OF WATERBURY, CONNECTICUT.

ART OF SYNCHRONOUS OPERATION OF ENTERTAINMENT APPARATUS.

Application filed April 22, 1920. Serial No. 375,724.

*To all whom it may concern:*

Be it known that I, WILLIAM H. BRISTOL, a citizen of the United States, and a resident of Waterbury, in the county of New Haven and State of Connecticut, have invented certain new and useful Improvements in the Art of Synchronous Operation of Entertainment Apparatus, of which the following is a specification.

In the synchronous operation of entertainment apparatus, particularly as of motion picture apparatus with other entertainment apparatus, for example a talking machine, it frequently occurs that the synchronism is disturbed due to various causes and that difficulty is experienced in resynchronizing properly the two or more pieces of apparatus. Furthermore, in the case of a synchronized film if repair of same becomes necessary, it is likely that a proper matching may not be effected. This results in the throwing out of synchronism of the picture during projection, particularly as it is difficult to determine just exactly the particular length of film to replace in such instances. Moreover, it will be appreciated that in "framing" a picture, synchronism will also be disturbed.

The present invention has for its object to provide for resynchronization in a simple and accurate manner in the event of a disturbance of synchronism from any cause, as well as to afford facilities for accurately effecting repair of the film in case of breakage or destruction thereof.

More particularly, the invention consists in providing a plurality of indicators which shall be simultaneously visible to an operator, or visible and audible; and in case of a synchronized film, one may be located in proximity to the operator of the motion picture machine and the other or others at a distant point visible also to the said operator, said indications corresponding to the movements of the respective synchronized apparatus and respectively controlled thereby. Each indicator is caused to be operated uniformly in cycles thru its control by the respective apparatus and preferably to simulate a rotary movement, said movement possessing certain characteristics at predetermined intervals. Moreover, the said indicative characteristics of the various apparatus are initially caused to register; and in the event of a displacement therebetween, the indicators are again made to conform by means of resynchronizing mechanism under suitable control. This resynchronizing mechanism is adapted to advance or retard one of the said controlling apparatus relatively to the other until the corresponding characteristic indications again conform. The cycle of characteristic indications is so chosen that, in the case of a film, a more than sufficient amount thereof which might possibly be disturbed may pass thru the projecting apparatus, all of which will be more fully set forth hereinafter and will best be understood by reference to the accompanying drawings, in which—

Fig. 1 illustrates more or less diagrammatically the general arrangement of the various apparatus.

Fig. 2 is a view of a strip or film provided with indications in accordance with my invention.

Similar characters of reference designate corresponding parts thruout the several views.

Referring to the drawings, 10 designate a stage or other suitable support provided with the usual screen 11 or the like upon which the pictures 12 are to be projected in well-known manner from a suitable projecting machine 13 arranged in a booth 14. The booth is provided with the usual aperture 15 thru which the rays from the machine are projected and preferably with an aperture 15' which affords a view of the picture. Beside the screen 11, or in any other convenient location, and usually concealed from the audience, there is installed a talking machine or other entertainment apparatus 16 which is arranged to be synchronized with the motion picture apparatus, for example, in manner set forth more particularly in my prior U. S. Patent No. 1234127 as well as in accordance with the arrangement set forth in my co-pending application Serial No. 313263, filed July 25, 1919.

However, in addition to what is set forth in the aforesaid patent and patent application, the present invention contemplates an accurate and simple means for insuring and maintaining positive synchronization of the various apparatus employed.

To this end, the talking or other machine 16 is further arranged to drive in synchronism therewith a motor or like device, indicated by the box 17, which device in any well-known manner is arranged to impart a uniform movement to a suitable member or indicator. For example, it may be arranged to drive at different speeds two pointers or arms 18 and 19 respectively and mounted to rotate about a common center. In the present instance, the rotation is so arranged that the one pointer 19 will move twelve times as fast as the pointer 18 and, therefore, will coincide therewith twelve times during a complete cycle. This mechanism is arranged at any convenient point so as to be visible, for example, to the operator of the motion picture apparatus; and is herein shown as mounted on the inside of the booth 14.

Moreover, on the picture 12 as projected upon the screen, there is displayed, for example in one corner thereof and on a small scale, a picture 20 of a similar indicator device. The same is obtained by photographing, in the production of the film, the movement of the pointers of an indicator device similar to that described in connection with the talking machine. This indicator device it is to be understood will be driven by or controlled from the motion of a motion picture taking apparatus synchronized with sound recording or other apparatus. In this manner, there is produced on the film or strip provided with the pictures 12 a series of indications or photographs of the indicator pointers, successive positions of same on the succeeding pictures being angularly displaced, as indicated (greatly exaggerated) by the pictures 21—34, Fig. 2, and in accordance with the corresponding positions of the indicators which were photographed. It will, therefore, be understood that when the pictures are projected, with the indicator pointers photographed thereon, the latter will simulate a rotary movement as the film is advanced, the same appearing upon the screen 11 and thus being visible also to the operator of the projecting machine. The respective positions of the pointer arms are initially made to register at a predetermined point in the operation of all of the synchronized apparatus. That is to say, should the indicator pointers corresponding to the talking machine register at the zero position, or beginning of the cycle, then the projected pointers shown on the picture 12 will also coincide and be at the zero position (picture 21, Fig. 2). Coincidence of the pointers will occur for the example set forth twelve times during each cycle; and the operator in the booth, or any other observer as the case may be, will note the position of the two or more sets of indicators to determine whether both arrive at coincidence at the same time or position. In this manner any disturbance of synchronism may be readily detected and the displacement corrected by, for example, advancing or retarding the motion of one of the apparatus as in manner more particularly set forth in U. S. Letters Patent No. 1234170, granted July 24, 1917 to Manfred J. Johnson. This may be effected by imparting a rotation to the rotatably mounted field 35 of the synchronizer for the motion picture machine, as by means of a hand wheel or like member 36 geared thereto. It will be understood that the controlling synchronizer 37, requiring but slight effort for rotation relatively to the governed talking machine, the said synchronizer will receive the entire advancing or retarding effect and correspondingly advance or retard the feed of the film, while the talking machine will continue its necessarily uniform rotation.

To obviate the necessity of watching the indicator pointers 18, 19, inside the booth and controlled by the motion of the talking machine, a further and audible indicator may be displayed as in providing a bell or other audible sounding device 38 which is controlled from the indicator 17 and suitably geared down to close an electric circuit say once every cycle. This device 38 may be employed in addition to the indicators 18, 19 or the latter may then be dispensed with, if desired.

Moreover, in the event of a breakage of the film, or loss of a portion thereof, the correct number of pictures may be replaced and an accurate repair of same effected in that the successive pointer arm positions will afford means of determining the precise number required. It will be understood also that the cycles of the pointer arms can be chosen to suit the greatest length of film that it is ever likely to require replacement. In the present instance, the same is such that one hundred and forty-four (144) pictures will be advanced before the cycle is completed and nine (9) feet of film may be accounted for.

Furthermore, in the production of the original film, a check is had as the same may be quickly run thru the projector and any missing portions detected thru the interruption of the uniform movement afforded by projected pointer positions.

I claim:

1. In the art of synchronous operation of entertainment apparatus: the method of maintaining synchronism between a plurality of entertainment apparatus, which consists in displaying a plurality of pairs of indicators, each pair corresponding to the movement of the respective synchronized apparatus and respectively controlled thereby, imparting to each pair a uniform movement, the movement of the individual indicators of a pair being different to effect coincidence of the members of a pair at predetermined intervals, initially registering the corresponding coincidences of the various pairs, and conforming same in the event of a displacement therebetween.

2. In the art of synchronous operation of entertainment apparatus: the method of maintaining synchronism between a plurality of entertainment apparatus, which consists in displaying a plurality of pairs of indicators, each pair corresponding to the movement of the respective synchronized apparatus and respectively controlled thereby, causing each pair of indicators to simulate a uniform rotary movement, the movements of each member of a pair however differing to effect coincidence of the members of a pair at predetermined intervals, initially registering the corresponding coincidences of the various pairs, and conforming same in the event of a displacement therebetween.

3. In the synchronous operation of a motion picture projector with other entertainment apparatus: the method of maintaining synchronism between same, which consists in projecting with the picture a representation of a pair of indicator members correspondingly to the movement of the picture, said indicator members simulating a uniform rotary movement, the movement of the two members differing to effect coincidence at predetermined intervals, imparting from the other entertainment apparatus to a further pair of indicators a similar movement, initially registering the corresponding coincidences of the respective pairs, and conforming same in the event of a displacement therebetween.

4. In combination: motion picture apparatus and other entertainment apparatus synchronized therewith; indicator mechanism driven from said other apparatus and having two rotating members arranged to coincide at predetermined intervals; a film advanced by said motion picture apparatus, and having an indicator photographed thereon consisting of two pointer members whose successive positions on succeeding pictures of the film are displaced angularly, the displacement of the two pointers being different so that the pointers will simulate a rotary movement when the film is advanced in projecting the pictures thereof and periodically coincide.

Signed at New York, in the county of New York and State of New York, this 20th day of April, A. D. 1920.

WILLIAM H. BRISTOL.